(12) United States Patent
Kleptsyn

(10) Patent No.: US 9,323,097 B2
(45) Date of Patent: Apr. 26, 2016

(54) REFLECTIVE COLOR FILTER AND COLOR DISPLAY DEVICE

(71) Applicant: Vladimir Kleptsyn, Brookline, MA (US)

(72) Inventor: Vladimir Kleptsyn, Brookline, MA (US)

(*) Notice: Subject to any disclaimer, the term of this patent is extended or adjusted under 35 U.S.C. 154(b) by 383 days.

(21) Appl. No.: 13/781,785

(22) Filed: Mar. 1, 2013

(65) Prior Publication Data

US 2014/0247415 A1    Sep. 4, 2014

(51) Int. Cl.
  *G02F 1/1335*  (2006.01)
  *G02B 5/20*    (2006.01)
  *G02B 5/28*    (2006.01)

(52) U.S. Cl.
  CPC .......... *G02F 1/133514* (2013.01); *G02B 5/201* (2013.01); *G02B 5/286* (2013.01); *G02F 2001/133521* (2013.01)

(58) Field of Classification Search
  CPC .................................. G02B 5/282; G02B 5/286
  See application file for complete search history.

(56) References Cited

U.S. PATENT DOCUMENTS

| | | | |
|---|---|---|---|
| 4,327,967 A | 5/1982 | Groth | |
| 5,734,457 A | 3/1998 | Mitsui | |
| 6,097,456 A | 8/2000 | Wang | |
| 6,252,703 B1 * | 6/2001 | Nakamura | G02B 1/10 359/360 |
| 6,573,961 B2 | 6/2003 | Jiang | |
| 7,274,417 B2 | 9/2007 | Olczak | |
| 7,486,355 B2 | 2/2009 | Rho | |
| 7,705,280 B2 * | 4/2010 | Nuzzo et al. | 250/208.1 |
| 7,777,944 B2 | 8/2010 | Ho | |
| 7,811,725 B2 | 10/2010 | Chen | |
| 2002/0086164 A1 * | 7/2002 | Anzaki | B32B 17/10174 428/432 |
| 2003/0090195 A1 | 5/2003 | Teng | |
| 2008/0013178 A1 | 1/2008 | Terada | |
| 2008/0057264 A1 * | 3/2008 | Morimoto | B32B 27/02 428/98 |
| 2011/0116010 A1 | 5/2011 | Nagata | |
| 2011/0285942 A1 * | 11/2011 | Guo et al. | 349/96 |
| 2011/0294305 A1 | 12/2011 | Jacobs | |

OTHER PUBLICATIONS

Mikhail Polyanskiy, Optical constants of TiO2, May 18, 2015, RefractiveIndex.INFO website, "http://refractiveindex.info/?shelf=main&book=TiO2&page=Devore-o"*

* cited by examiner

*Primary Examiner* — Jessica M Merlin
*Assistant Examiner* — Mark Teets

(57) ABSTRACT

The invention is related to thin film optical filters, and can be used in liquid crystal displays (LCD) in order to increase their brightness, and provide savings in energy consumption. According to the invention, a reflective color filter for visible light substantially transmitting a light of the chosen spectral range entering into it and substantially reflecting a visible light of other spectral ranges, includes an odd total number of alternate nonmetallic and metal layers, and the first and last layers are nonmetallic ones, and each metal layer is placed between nonmetallic layers, each nonmetallic layer possesses a refractive index not less than 2.2 and thickness not less than 40 nanometers, and each metal layer possesses the thickness in a range from 10 to 40 nanometers.

13 Claims, 6 Drawing Sheets

REFLECTIVE COLOR FILTER AND COLOR DISPLAY DEVICE

BACKGROUND OF THE INVENTION (a) Field of the Invention

The invention relates to color optical filters, in particular, to color transmissive-reflective filters and can be used in color displays and devices for optical communication and information processing.

(b) Description of the Related Art

A known color filter of absorptive type transmitting incident light of the chosen spectral range and absorbing light of other spectral ranges, and the liquid crystal display including the filter are disclosed in U.S. Pat. No. 7,486,355. In this absorptive color filter, in particular, applied in liquid crystal displays, photoresist is used, painted over with dyes or their pigments. A drawback of this optical filter is the light energy loss at light absorption.

The color optical filter which reflects incident light of the chosen spectral ranges and transmits light of other spectral ranges, designed on the basis of layers cholesteric liquid crystals is known and disclosed in U.S. Pat. No. 6,573,961. This optical filter contained in the liquid crystal display is also described in the same patent. Drawbacks of this optical filter and the liquid crystal display including it are its relatively large thickness (not less than 5 micrometers), which makes it hard to place the filter between the plates of liquid crystal display without changing operating voltage values as the gap between the plates is 5-10 micrometers, and complexity of its fabrication.

The color optical filter of interference type, which transmits incident light of the chosen spectral range and reflects light of other spectral ranges consisting of alternating layers, with high and low refractive indices is known and disclosed in U.S. Pat. No. 7,924,374. This optical filter contained in the liquid crystal display also described in the same patent. However, the described optical filter allows eliminating absorption of light energy in it and in the display only at small working angles, not exceeding 10 degrees according to our estimations. This is serious disadvantage of this optical filter so application this filter in liquid crystal displays does not make any sense.

Metal-dielectric-metal interference optical filter of Fabry-Perot type, which transmits incident light of the chosen spectral range and reflects light of other spectral ranges, in which a dielectric layer is placed between two reflecting metal layers is known and disclosed in U.S. Pat. No. 7,811,725. This optical filter is placed on a substrate that is also described in the same patent, and applied, in particular, in the liquid crystal displays. The drawbacks of this optical filter are low light transmission of the chosen spectral ranges, not exceeding 70%, and small working angles, not exceeding 15 degrees according to our estimations.

BRIEF SUMMARY OF THE INVENTION

An object of the invention is to provide a reflective color filter of visible light and a display including it, in which substantially there is low loss of visible light energy due to a substantial transmission of entering visible light of the chosen spectral range and substantial reflection of entering visible light of other (complementary) spectral ranges that after re-reflection in a light source are used in an optical filter of other colors.

Another object of the invention is creating the color optical filter of visible light possessing wide working angles and providing color invariance at various viewing angles at an inclination from normal of not less than 50°.

One more object of the invention is creating a color optical filter of visible light with a small thickness of not more than 5 micrometers.

According to the invention, a reflective color filter of visible light substantially transmitting a light of the chosen spectral range entering into it and substantially reflecting a visible light of other spectral ranges, includes an odd total number of alternate nonmetallic and metal layers, and the first and last layers are nonmetallic ones, and each metal layer is placed between nonmetallic layers, each nonmetallic layer possesses a refractive index not less than 2.2 and thickness not less than 40 nanometers, and each metal layer possesses the thickness in a range from 10 to 40 nanometers.

BRIEF DESCRIPTION OF THE DRAWINGS

The invention is clarified by drawings which do not completely cover and do not limit the whole scope of claims of the presented technical solution, but only illustrate some embodiments of the color optical filter and the color display including it.

DETAILED DESCRIPTION OF THE INVENTION

Figure 1:
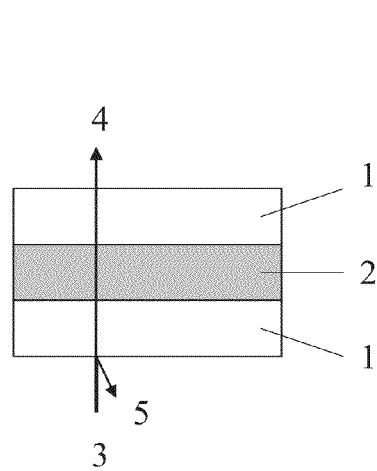
FIG. 1 shows a reflective color filter of visible light, which includes two nonmetallic layers with a refractive index not less than 2.2 and thickness not less than 40 nanometers, and one metal layer of the thickness in a range from 10 to 40 nanometers, and the mentioned metal layer is placed between the mentioned nonmetallic layers.

In FIG. 1 the reflective color filter of visible light including two nonmetallic layers 1 with refractive index of not less than 2.2 and thickness not less than 40 nanometers and one metal layer 2 with a thickness in a range from 10 to 40 nanometers, and the metal layer 2 is located between the mentioned nonmetallic layers 1 is shown.

The reflective color filter works as follows. The white light 3 from a light source (the light source is not shown on FIG. 1) enters into an optical filter, which substantially transmits the light 4 of chosen spectral range, for example, of green color, and substantially reflects the light 5 of other spectral ranges, for example, of blue and red colors.

Light 5 after multiple reflections in the light source (or in other reflective elements, which also are not shown on FIG. 1) is transmitted at least partially by other reflective color filter (which are not shown on FIG. 1), substantially transmitting blue and red color, accordingly.

A version of color optical filter with a metal layer of not less than 15 nanometers thick, and nonmetallic layers with refractive index of not less than 2.3 is preferable.

A version of color optical filter with a metal layer of not less than 20 nanometers thick and nonmetallic layers with refractive index of not less than 2.5 is more preferable.

Figure 2:
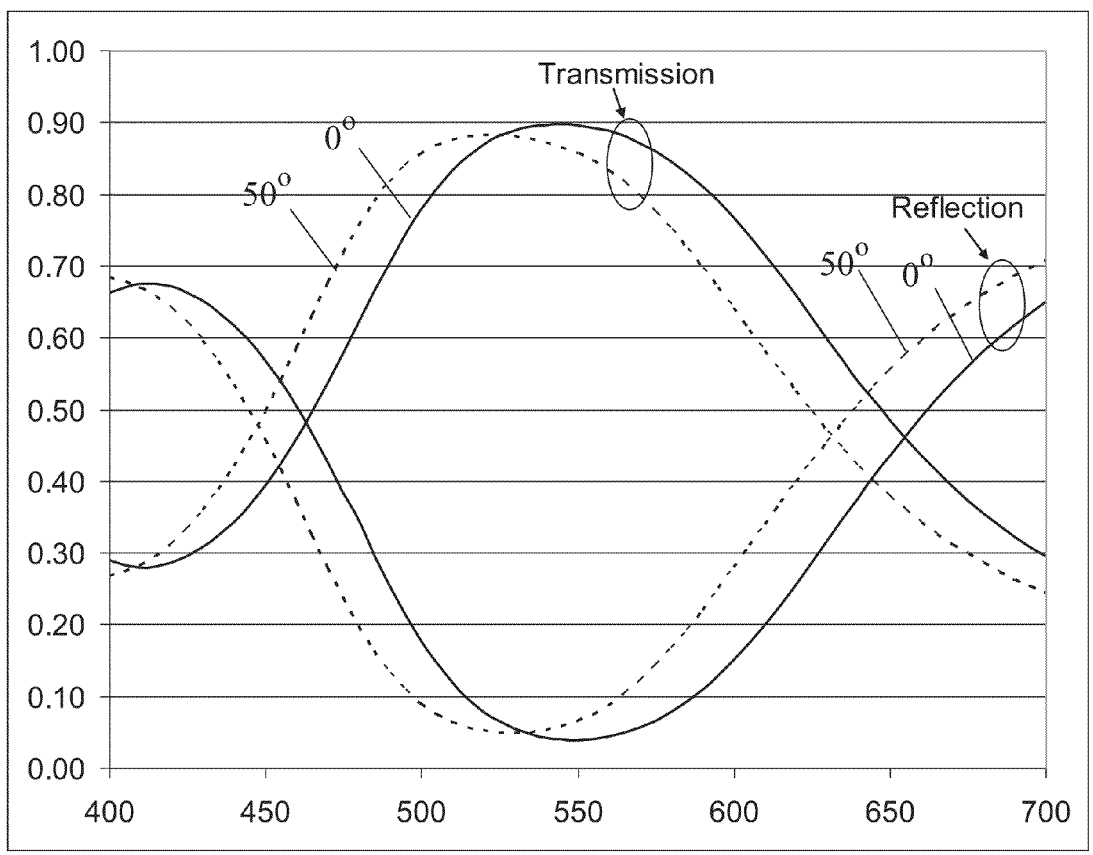
FIG. 2 shows transmission and reflection spectra of a reflective color filter according to FIG. 1 at various working angles.

Wide working angles of the color optical filter are illustrated in FIG. 2, where transmission and reflection spectra of the reflective color filter of FIG. 1 are shown at various working angles, said filter is transmitting green color and reflecting both blue and red color. It is clearly seen in FIG. 2, that transmission and reflection spectra are practically not changed with changing incident angle of the light beam entering from air at the angle up to 50° from a normal to the reflective color filter.

The reflective color filter can be deposited on the polished substrate made from any transparent material, for example, from glass or polymer, with many known ways, for example, thermal evaporation, evaporation by an electronic beam, etc.

Metal layers, preferably, are made of the materials chosen from a group consisting of: Gold Au, Silver Ag, Aluminum Al, Chromium Cr, Copper Cu, Titanium Ti, Nickel Ni, Manganese Mn, Molybdenum Mo, Bismuth Bi, Tin Sn, Rhodium Rh, Platinum Pt, Antimony Sb and any alloys or solid solution of mentioned substances. For better adhesion to the mentioned nonmetallic layers the mentioned metal layer can include additionally sub-layers of total thickness of not greater than 5 nanometers and made of substances selected from group, including Chromium Cr, Titanium Ti, Nickel Ni, Vanadium V, Zirconium Zr, Hafnium Hf, Niobium Nb, Molybdenum Mo, and any mixture, alloy or solid solution of mentioned substances.

The mentioned nonmetallic layers, preferably, are made of the materials chosen from a group comprising Titanium Dioxide $TiO_2$, Zinc Sulphide ZnS, Zinc Selenide ZnSe, Gallium Phosphide GaP, Gallium Nitride GaN, Tantalum Pentoxide $Ta_2O_5$, Niobium Pentoxide $Nb_2O_5$, Lead Molibdate $PbMoO_4$, Silicon Nitride $Si_3N_4$, Silicon Si, Germanium Ge, Semiconductors $A_3B_5$ type, Semiconductors $A_2B_6$ and any mixture or solid solution of mentioned substances. These mentioned two nonmetallic layers 1 can be made of the same or different materials, and thickness of these layers can be the same or different.

Figure 3:
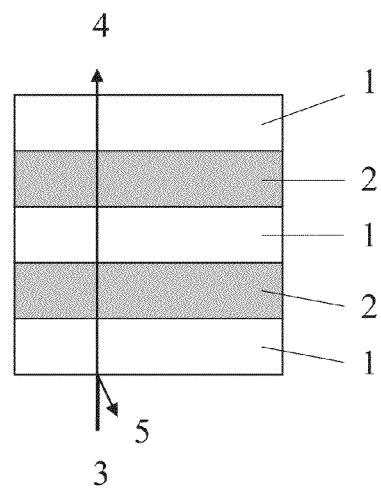
FIG. 3 shows a reflective color filter of visible light which includes three nonmetallic layers with a refractive index not less than 2.2 and thickness not less than 40 nanometers, and two metal layers, each metal layer of the thickness in a range from 10 to 40 nanometers, and each metal layer is located between the mentioned nonmetallic layers.

In FIG. 3 the reflective color filter of visible light including three nonmetallic layers 1 and two metal layers 2 is shown, at that the first metal layer is located between the first and the second nonmetallic layers, and the second metal layer is located between the second and third nonmetallic layers. The reflective color filter works as follows. Light beam 3 from a light source (the light source in FIG. 3 is not shown) enters into reflective color filter which substantially transmits entering into it light 4 of the chosen spectral range, green in this version of the reflective color filter, and substantially reflects light 5 of the other, complementary spectral ranges, blue and red color in this version. Light 5 after re-reflections in a light source (or in other reflective elements which also have not been shown in FIG. 3) at least partially transmits by reflective color filter of other color (on FIG. 3 are not shown), substantially transmitting blue and red colors, accordingly.

Figure 4:
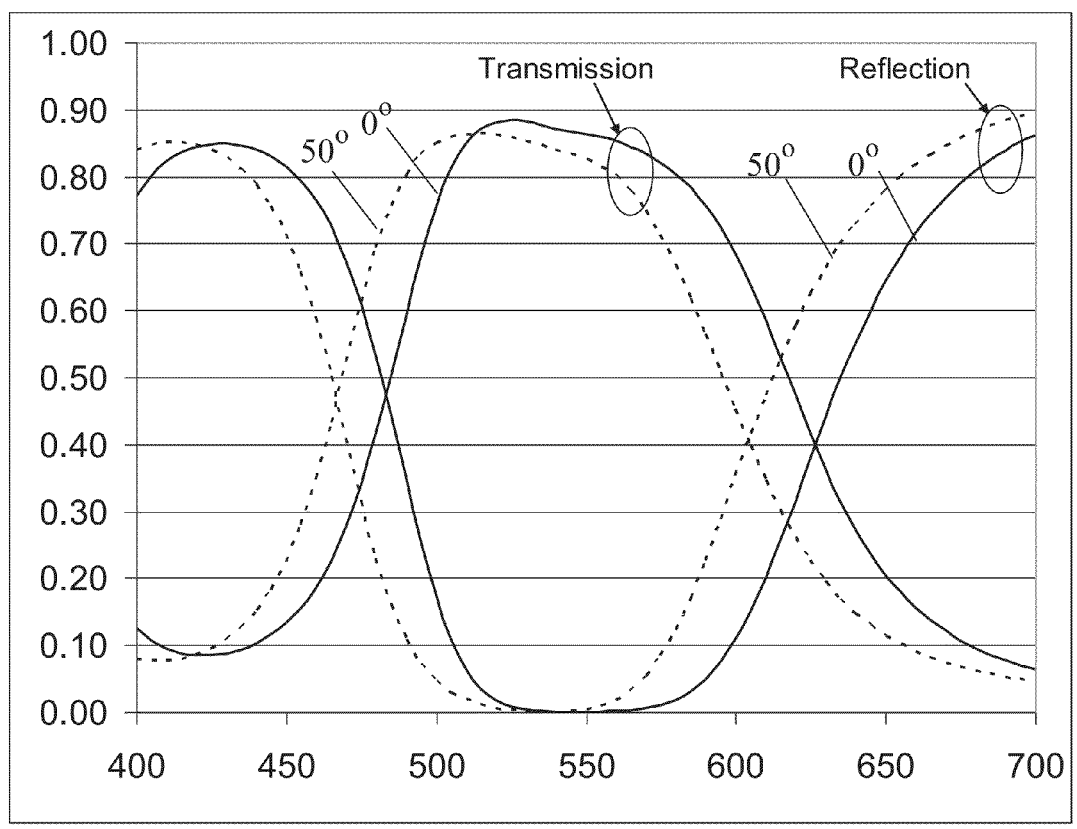
FIG. 4 shows the transmission and reflection spectra a reflective color filter according to FIG. 3 at various working angles.

Wide working angles of the reflective color filter are also illustrated in FIG. 4 where transmission and reflection spectra of the reflective color filter of FIG. 3 are shown at various working angles. This reflective color filter version is transmitting green color and reflecting both blue and red color. Application of three nonmetallic layers 1 and two metal layers 2 allows obtaining steeper edges of transmission and reflection spectra of the reflective color filter and greater reflection coefficient of light out of reflective color filter transmission spectral band that improves the filter's overall color characteristics. In FIG. 4 also it is seen, that transmission and reflection spectra are practically not changed with changing incident angle of the light beam entering from air at the angle up to 50° from a normal to the reflective color filter.

Figure 5:
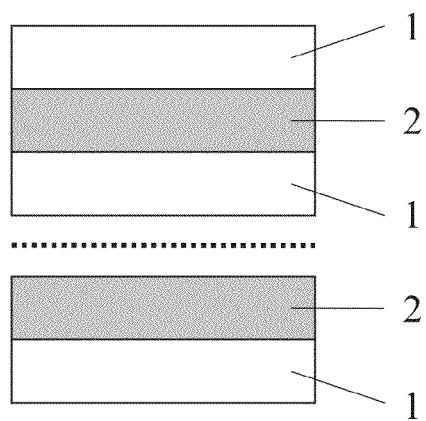
FIG. 5 shows a reflective color filter of visible light, which includes odd total of alternating nonmetallic and metal layers (more than three), and first and last layers are nonmetallic ones, and each metal layer is located exclusively between nonmetallic layers.

In FIG. 5 the reflective color filter of visible light including an odd in total of alternating nonmetallic 1 and metal layers 2 is shown, at that first and last layers are nonmetallic, and each metal layer 2 is located exclusively between nonmetallic layers 1. Increasing the number of layers in the optical color filter improves its color characteristics.

Figure 6:
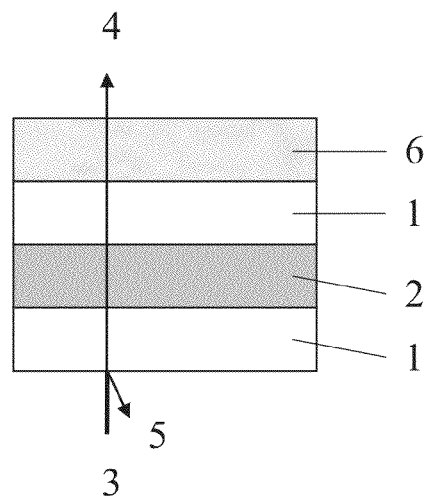
FIG. 6 shows a reflective color filter additionally including an absorptive color filter.

In FIG. 6 the reflective color filter of visible light additionally including an absorptive color filter 6 located after a reflective optical filter (on a direction of light 3) is shown. The role of the absorptive color filter 6 is an improvement of color purity of the outgoing light by absorption of residual light of complementary color.

Figure 7:
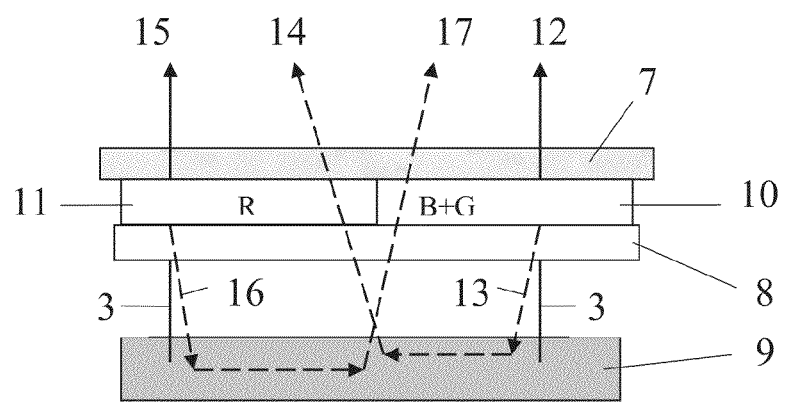
FIG. 7 shows the color display including two reflective color optical filters of visible light deposited on a display plate.

In FIG. 7 the color display including one transparent plate 7 with control electrodes located on it (electrodes are not shown on the FIG. 7), a layer of an electro-optical material 8 changing the optical properties due to an electric voltage applied to control electrodes and deposited on the plate 7, and a light source 9 is shown. This version of the display contains two different reflective color filters of visible light, for example, blue-green 10 and red 11 colors, here the colors are given <<on transmission>>, and colors of optical filters differ both on transmission and reflection spectra.

White light 3 from a light source 9 falls on the blue-green reflective color filter 10 that transmits blue and green light 12, but reflects red light 13. After multiple reflections into the light source 9 at least a portion of the reflected red light 13 falls on the red reflective color filter 11 and transmits, forming red light 14.

Similarly, white light 3 from a light source 9, falls also on the red reflective color filter 11 that transmits red light 15, but reflects blue and green light 16. After multiple reflections into the light source 9 at least the part of the reflected blue and green light 16 falls on the blue-green reflective color filter 10 and transmits, forming blue-green light 17.

So, the blue-green reflective color filter 10 not only transmits the light 12 of the blue-green color, but also the light 17 of blue-green color which is at least a portion of light 16 of the blue-green color, reflected by the red reflective color filter 11. Thus, there is no absorption of light of blue-green color, on the contrary, all blue and green light comes out from the blue-green reflective color filter 10.

Similarly, the red reflective color filter 11 not only transmits the light 15 of the red colors, but also light 14 of red color which is at least a portion of light 13 of the red colors, reflected by the blue-green color optical filter 10. Thus, there is no absorption of light of red color, on the contrary, all red light comes out from the red reflective color filter 11.

A feature of the invented color display is inclusion in it of the reflective color filters of visible light 10 and 11, which includes an odd total number of alternate nonmetallic and metal layers, and the first and last layers are nonmetallic ones, and each metal layer is placed between nonmetallic layers, each nonmetallic layer possesses a refractive index not less than 2.2 and thickness not less than 40 nanometers, and each metal layer possesses the thickness in a range from 10 to 40 nanometers.

The specified features provide an achievement of the technical result, namely: an absence of absorption of visible light energy in reflective color filters along with wide working angles of the display. This result is assured with an optimum balance of thicknesses of the nonmetallic layers, their refractive index, and the thickness of a metal layer.

As a layer of an electro-optical material 8, (pixels of this layer are not shown in FIG. 7) enabling to change its optical properties (birefringence, light scattering, a phase shift, optical activity and others) locally due to a voltage applied to control electrodes liquid crystal materials, for example, encapsulated in a polymeric matrix, and a number of others can be used. The layer of an electro-optical material 8 changes only intensity of light transmitting through optical filters 10 and 11, but does not change color of light that comes out of each optical filter.

Figure 8:
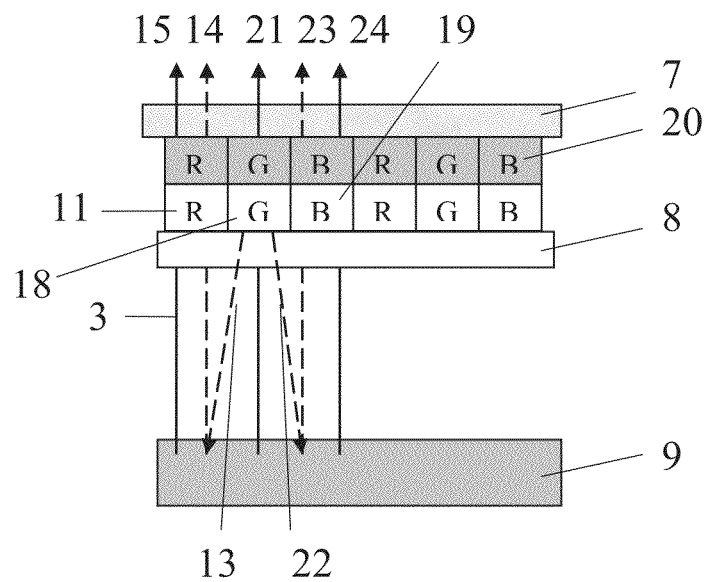
FIG. 8 shows the color display including groups of three reflective color filters of visible light deposited on a display plate, and the absorptive color filters are additionally deposited on reflective color optical filters so that their "transmission" colors are consistent: for example red-to-red, green-to-green and blue-to-blue.

In FIG. 8 another version of the invented color display including one transparent plate 7 with control electrodes located on it (electrodes are not shown in FIG. 8), a layer of an electro-optical material 8 changing the optical properties due to a voltage applied to control electrodes and deposited on the plate 7, and a light source 9 is shown. This version of the display contains groups of three different reflective color filters of visible light, for example, red color 11, green color 18 and blue color 19, here the colors are given <<on transmission>>, i.e. all three reflective color filters differ both on transmission and reflection spectra. This color display shown on FIG. 8 additionally includes a matrix of three-color (red, green, and blue) absorptive color optical filters 20, so that reflective color filters 11, 18, 19 are located between the matrix of the absorptive color optical filters 20 and the light source 9, and color of each absorptive color optical filter coincides with color of reflective color filters 11, 18, 19. The role of a matrix of the absorptive color optical filters 20 is improvement of color purity of the outgoing light (from each sub-pixel) by absorption of residual light of complementary colors.

White light 3 from the light source 9 falls on the reflective color filter 18 of green color that transmits green light 21 but reflects red light 13 and blue light 22. After multiple reflections into the light source 9 at least a portion of the reflected red light 13 falls on the red reflective color filters 11 and transmits, forming red light 14. After multiple reflections into the light source at least a portion of reflected blue light 22 falls on the blue reflective color filters 19 and transmits, forming blue light 23.

Similar transmissions and reflections occur when white light 3 from a light source 9 falls on the red reflective color filter 11 which transmits red light 15, but reflects blue and green lights (not shown on FIG. 8) and on the blue reflective color filter 19 which transmits blue light but reflects red and green light (not shown on FIG. 8).

So, not only transmitted red light 15 comes out from the red reflective color filter 11 but also red light 14 that is at least a portion of red light 13 reflected by green reflective color filter 18 and at least a portion of the red color (not shown in FIG. 8) light reflected by the blue reflective color filter 19.

Similarly, not only transmitted green light 21 comes out from the green reflective color filters 18 but also green light that is at least a portion of green light reflected by red reflective color filters 11 and at least a portion of the green color reflected by the blue reflective color filters 19 (this process is not shown in FIG. 8)

Similarly, not only transmitted blue light 24 comes out from the blue reflective color filter 19 but also blue light that is at least a portion of blue light reflected by red reflective color filter 11 and at least a portion of the blue color reflected by the green reflective color filter 18 (this process is not shown in FIG. 8)

Thus, there is no absorption of light of any color, on the contrary, all light of red, green, and blue colors comes out from reflective color filters 11, 18 and 19 accordingly.

Figure 9:
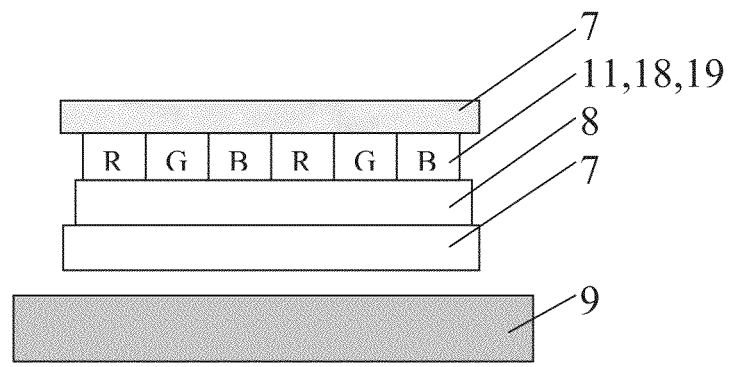
FIG. 9 shows the color display including groups of three reflective color filters of visible light deposited on the inner side of the display top plate.

In FIG. 9 one more version of the color display including two transparent plates 7 with control electrodes located on them (electrodes are not shown in FIG. 9), the layer of an electro-optical liquid crystal material 8 changing its optical properties due to a voltage applied to control electrodes and placed between the plates 7, and the light source 9 is shown. This version of display includes groups of three different reflective color filters of visible light, for example, red color 11, green color 18 and blue color 19, here the colors are given <<on transmission>>, i.e. all three optical filters differ both on transmission and reflection spectra. The named reflective color filters are deposited on the inner side of one of plates 7.

Figure 10:
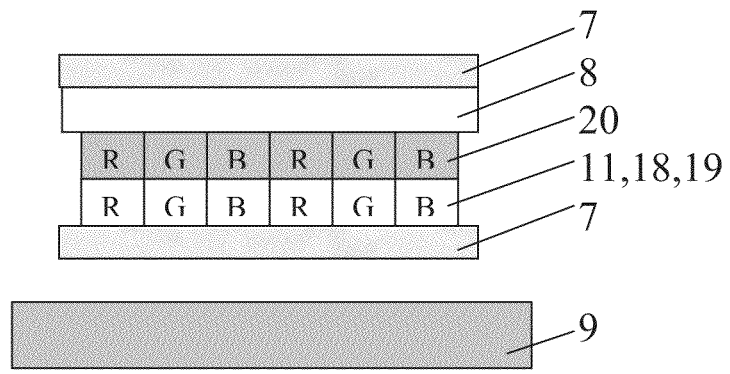
FIG. 10 shows the color display including groups of three reflective color filters of visible light deposited on the inner side of the display bottom plate; over reflective color filters the absorptive color filters are additionally deposited so that their colors <<on transmission>> are consistent: for example red-to-red, green-to-green and blue-to-blue.

In FIG. 10 one more version of the color display, including two transparent plate 7 with control electrodes located on them (electrodes are not shown in FIG. 10), the layer of an electro-optical liquid crystal material 8 changing its optical properties due to a voltage applied to control electrodes and placed between the named plates 7, and the light source 9 is shown. This version of the display includes groups of three different reflective color filters of visible light, for example, red color 11, green color 18 and blue color 19, the colors here are given <<on transmission>>, i.e. all three optical filters differ both on transmission and reflection spectra, and the matrix of absorptive color optical filters 20. The named reflective color filters 11,18,19 are deposited on the inner side of the plate that is closer to the light source, and the matrix of absorptive color filters 20 is deposited on reflective color filters 11, 18 and 19, so that color of each of absorptive color filters coincides with color of reflective color filters 11, 18, 19 accordingly.

Figure 11:
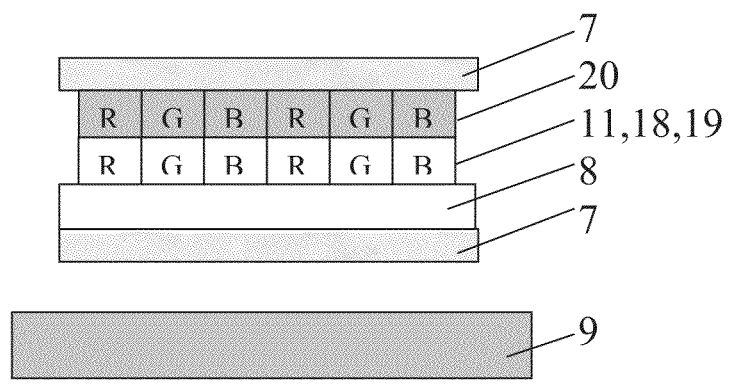
FIG. 11 shows the color display including groups of three reflective color filters of visible light deposited over the absorptive color filters, that are additionally deposited on the inner side of the display top plate so that the colors <<on transmission>> of two types of optical filters are consistent: for example red-to-red, green-to-green and blue-to-blue.

In FIG. 11 one more version of the color display, including two transparent plate 7 with control electrodes located on them (electrodes are not shown in FIG. 11), the layer of an electro-optical liquid crystal material 8 changing its optical properties due to a voltage applied to control electrodes and placed between the named plates 7, and the light source 9 is shown. This version of the display includes groups of three different reflective color filters of visible light, for example, red color 11, green color 18 and blue color 19, the colors here are given <<on transmission>>, i.e. all three reflective color filters differ both on transmission and reflection spectra, and the matrix of absorptive color optical filters 20. The named matrix of absorptive color optical filters 20 is deposited on the inner side of the plate 7 that is farther from the light source 9 while reflective color filters 11,18,19 are deposited on the matrix of absorptive optical filters 20, so that color of each of absorptive color optical filters coincides with color of reflective color filters 11, 18, 19 accordingly.

Figure 12:
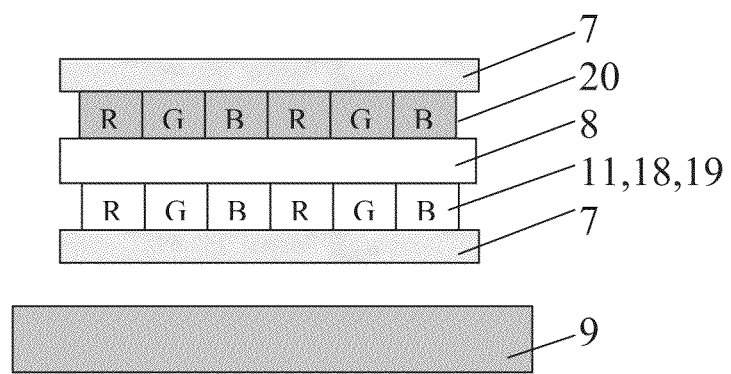
FIG. 12 shows the color display including groups of three reflective color filters of visible light deposited on the inner side of the display bottom plate and the absorptive color filters additionally deposited on the inner side of the display top plate so that the colors <<on transmission>> of two types of optical filters are consistent: for example red-to-red, green-to-green and blue-to-blue.

In FIG. 12 one more version of the color display, including two transparent plate 7 with control electrodes located on them (electrodes are not shown in FIG. 12), the layer of an electro-optical liquid crystal material 8 changing its optical properties due to a voltage applied to control electrodes and placed between the named plates 7, and the light source 9 is shown. This version of the display includes groups of three different reflective color filters of visible light, for example, red color 11, green color 18 and blue color 19, the colors here are given <<on transmission>>, i.e. all three reflective color filters differ both on transmission and reflection spectra, and the matrix of absorptive color optical filters 20. The named matrix of absorptive color optical filters 20 is deposited on the inner side of the plate 7 that is farther from the light source 9 while reflective color filters 11,18,19 are deposited on the inner side of the plate 7 that is closer to the light source 9, so that color of each of absorptive color optical filters coincides with color of reflective color filters 11, 18, 19 accordingly.

The technical result assured by aggregated attributes of the reflective color filters described here is: wide working angles and a small thickness of the optical filter as well as an absence of the light energy absorption. This result is achieved by the optimum balance of thicknesses of the nonmetallic layers, their refractive indexes, and the thickness of the metal layer(s).

What is claimed is:

1. A color display device comprising at least one transparent plate with control electrodes located on it, a layer of the electro-optical material deposited on this plate, a light source, and at least two reflective color filters,
    wherein each reflective color filter substantially reflects an incident visible light of the chosen spectral ranges and substantially transmits an incident visible light of other spectral ranges, including an odd total number of alternate nonmetallic and metal layers, and the first and last layers are nonmetallic ones, and each metal layer is placed between nonmetallic layers, wherein each nonmetallic layer possesses a refractive index of not less than 2.2 and thickness of not less than 40 nanometers, and each metal layer possesses the thickness in a range from 10 to 40 nanometers, and
    the at least two reflective color filters have a different transmission spectra and a different reflection spectra from each other, wherein a light, reflected from each of mentioned reflective color filters, after re-reflections in the light source at least partially transmits through other mentioned reflective color filter.

2. The color display device according to claim 1, wherein at least one of the reflective color filters includes two mentioned nonmetallic layers and one mentioned metal layer, and the mentioned metal layer is placed between the mentioned nonmetallic layers.

3. The color display device according to claim 1, wherein at least one of the reflective color filters includes first, second and third mentioned nonmetallic layer and first and second mentioned metal layer, and the first metal layer is placed between the first and the second nonmetallic layer, and the second metal layer is placed between the second and the third nonmetallic layer.

4. The color display device according to claim 1, wherein for at least one of the reflective color filters the thickness of each mentioned metal layer is not less 15 nanometers, and the refractive index of each mentioned nonmetallic layer is not less than 2.3.

5. The color display device according to claim 1, wherein for at least one of the reflective color filters the thickness of each mentioned metal layer is not less 20 nanometers, and the refractive index of each mentioned nonmetallic layer is not less than 2.5.

6. The color display device according to claim 1, wherein for at least one of the reflective color filters the mentioned metal layer is made of substance selected from group, consisting of Gold Au, Silver Ag, Aluminum Al, Chromium Cr, Copper Cu, Titanium Ti, Nickel Ni, Manganese Mn, Molybdenum Mo, Bismuth Bi, Tin Sn, and any alloys or solid solution of mentioned substances.

7. The color display device according to claim 1, wherein for at least one of the reflective color filters the mentioned metal layer includes additionally sub-layers of thickness no more than 5 nanometers and made of substances selected from group, consisting of Chromium Cr, Titanium Ti, Nickel Ni, Vanadium V, Zirconium Zr, Hafnium Hf, Niobium Nb, Molybdenum Mo, and any mixture, alloy or solid solution of mentioned substances.

8. The color display device according to claim 1, wherein for at least one of the reflective color filters the mentioned nonmetallic layer is made of substances selected from group, consisting of Titanium Dioxide $TiO_2$, Zinc Sulphide ZnS, Tantalum Pentoxide $Ta_2O_5$, Zinc Selenide ZnSe, Gallium Phosphide GaP, Gallium Nitride GaN, Niobium Pentoxide $Nb_2O_5$, Lead Molibdate $PbMoO_4$, Boron Nitride BN, Silicon Nitride $Si_3N_4$, Aluminum Nitride AN, Silicon Si, Germanium Ge, Semiconductors $A_3B_5$ type, Semiconductors $A_2B_6$ type and any mixture or solid solution of mentioned substances.

9. The color display device according to claim 1, wherein the at least two reflective color filters includes groups of at least three reflective color filters with a different transmission spectra and a different reflection spectra, wherein a light, reflected from each of mentioned reflective color filters, after re-reflections in a light source at least partially transmits through other mentioned reflective color filters.

10. The color display device according to claim 1, including two transparent plates, at least on one of which control electrodes are located, and the layer of an electro-optical material is liquid crystal layer, which is placed between the mentioned plates, and the mentioned reflective color filters are deposited on an inner side of one of the plates.

11. The color display device according to claim 10, wherein the reflective color filters are deposited on an inner side of the plate that is closer to a light source, and additionally a matrix of absorptive color filters is deposited on an inner side of the other plate.

12. The color display device according to claim 10, wherein the reflective color filters are deposited on an inner side of the plate that is closer to a light source, and additionally a matrix of absorptive color filters is deposited over the reflective optical filter.

13. The color display device according to claim 10, wherein additionally a matrix of color filters of absorptive type is deposited on an inner side of the plate that is farther from a light source, and reflective color filters are deposited over said matrix of absorptive color filters.

* * * * *